US006555081B2

(12) United States Patent
Hori et al.

(10) Patent No.: US 6,555,081 B2
(45) Date of Patent: Apr. 29, 2003

(54) METHOD OF THE PURIFICATION OF THE EXHAUST GAS FROM A LEAN-BURN ENGINE USING A CATALYST

(75) Inventors: Masao Hori, Himeji (JP); Makoto Horiuchi, Himeji (JP)

(73) Assignees: ICT Co., Ltd., Osaka (JP); International Catalyst Technology, Inc., Ridgefield Park, NJ (US)

( * ) Notice: Subject to any disclaimer, the term of this patent is extended or adjusted under 35 U.S.C. 154(b) by 0 days.

(21) Appl. No.: 09/417,887

(22) Filed: Oct. 14, 1999

(65) Prior Publication Data

US 2001/0051122 A1 Dec. 13, 2001

(30) Foreign Application Priority Data

Oct. 15, 1998 (JP) .......................... 10-293852

(51) Int. Cl.[7] .................. B01J 8/00; C01B 21/00; C01B 23/00; C01B 25/00; C01B 31/00
(52) U.S. Cl. .................. 423/239.1; 423/213.5
(58) Field of Search .............. 502/304, 327, 502/328, 330, 332, 333, 334, 339, 340, 344, 351, 355, 527.12; 423/22, 69, 111, 155, 179, 213.5, 239.1

(56) References Cited

U.S. PATENT DOCUMENTS

| | | | | |
|---|---|---|---|---|
| 4,105,590 A | * | 8/1978 | Koberstein et al. | 252/464 |
| 4,297,328 A | | 10/1981 | Ritscher et al. | |
| 4,369,132 A | * | 1/1983 | Kinoshita et al. | 252/466 PT |
| 4,378,307 A | * | 3/1983 | Brunelle et al. | 252/455 R |
| 4,448,756 A | * | 5/1984 | Hammerle et al. | 423/213.7 |
| 4,492,769 A | * | 1/1985 | Blanchard et al. | 502/262 |
| 4,497,783 A | * | 2/1985 | Barber | 423/213.5 |
| 4,624,940 A | * | 11/1986 | Wan et al. | 502/251 |
| 4,654,319 A | * | 3/1987 | Kim et al. | 502/304 |
| 4,714,694 A | * | 12/1987 | Wan et al. | 502/304 |
| 4,727,052 A | * | 2/1988 | Wan et al. | 502/327 |
| 4,904,633 A | * | 2/1990 | Ohata et al. | 502/304 |
| 4,931,419 A | * | 6/1990 | Blanchard et al. | 502/304 |
| 5,041,270 A | | 8/1991 | Fujitani et al. | |
| 5,053,378 A | * | 10/1991 | Blanchard et al. | 502/304 |
| 5,102,850 A | * | 4/1992 | Sanchez et al. | 502/261 |
| 5,124,304 A | * | 6/1992 | Blanchard et al. | 502/304 |
| 5,128,306 A | * | 7/1992 | Dettling et al. | 502/304 |
| 5,177,041 A | * | 1/1993 | Horiuchi et al. | 502/66 |
| 5,202,300 A | * | 4/1993 | Funabiki et al. | 502/304 |
| 5,258,349 A | * | 11/1993 | Dalla Betta et al. | 502/330 |
| 5,260,249 A | * | 11/1993 | Shiraishi et al. | 502/304 |
| 5,281,128 A | * | 1/1994 | Dalla Betta et al. | 431/7 |
| 5,286,699 A | * | 2/1994 | Ohata et al. | 502/304 |
| 5,326,253 A | * | 7/1994 | Dalla Betta et al. | 431/7 |
| 5,399,324 A | * | 3/1995 | Subramanian et al. | 423/213.7 |
| 5,405,260 A | * | 4/1995 | Della Betta et al. | 431/7 |
| 5,413,984 A | * | 5/1995 | Marecot et al. | 502/333 |
| 5,492,878 A | * | 2/1996 | Fujii et al. | 502/304 |
| 5,494,878 A | * | 2/1996 | Murakami et al. | 502/304 |
| 5,575,983 A | * | 11/1996 | Suzuki et al. | 423/213.5 |
| 5,597,771 A | * | 1/1997 | Hu et al. | 502/304 |
| 5,702,675 A | * | 12/1997 | Takeshima et al. | 423/213.5 |
| 5,756,057 A | * | 5/1998 | Tsuchitani et al. | 423/213.2 |
| 5,762,892 A | * | 6/1998 | Kasahara et al. | 423/213.5 |
| 5,849,254 A | * | 12/1998 | Suzuki et al. | 423/213.5 |
| 5,856,263 A | * | 1/1999 | Bhasin et al. | 502/333 |
| 5,911,960 A | * | 6/1999 | Miyoshi et al. | 423/213.5 |
| 5,915,951 A | * | 6/1999 | Euzen et al. | 431/7 |
| 5,922,293 A | * | 7/1999 | Miyoshi et al. | 423/213.5 |
| 5,948,376 A | * | 9/1999 | Miyoshi et al. | 423/213.5 |
| 5,948,723 A | * | 9/1999 | Sung | 502/303 |
| 5,968,870 A | * | 10/1999 | Iizuka et al. | 502/325 |
| 5,981,427 A | * | 11/1999 | Sung et al. | 502/325 |
| 5,990,038 A | * | 11/1999 | Suga et al. | 502/303 |
| 6,004,521 A | * | 12/1999 | Miyoshi et al. | 423/213.5 |
| 6,010,673 A | * | 1/2000 | Kanazawa et al. | 423/213.5 |
| 6,025,297 A | * | 2/2000 | Ogura et al. | 502/300 |
| 6,069,111 A | * | 5/2000 | Yamamoto et al. | 502/333 |
| 6,087,298 A | * | 7/2000 | Sung et al. | 502/333 |
| 6,159,897 A | * | 12/2000 | Suzuki et al. | 502/351 |
| 6,245,307 B1 | * | 6/2001 | Inui et al. | 423/231.5 |
| 6,284,210 B1 | * | 9/2001 | Euzen et al. | 423/213.5 |
| 6,350,421 B1 | * | 2/2002 | Strehlau et al. | 423/213.2 |

FOREIGN PATENT DOCUMENTS

| | | |
|---|---|---|
| EP | 0666099 | 4/1994 |
| EP | 0666103 | 2/1995 |
| JP | 60125250 | 4/1985 |
| JP | 1171625 | 7/1989 |
| JP | 08117600 | 5/1996 |

OTHER PUBLICATIONS

European Search Report, EP 99 12 0359, Feb. 18, 2000.
EP 0 716 876 A1, EPO, Jun. 19, 1996.
XP–0021300087, 1991 with English translation.
XP–002130088, 1996 with English translation.
XP–002130089, 1995, with English translation.

* cited by examiner

*Primary Examiner*—Stanley S. Silverman
*Assistant Examiner*—Cam N. Nguyen
(74) *Attorney, Agent, or Firm*—Selitto, Behr & Kim

(57) ABSTRACT

A catalyst for purifying the exhaust gas from a lean-burn engine, which includes a refractory inorganic oxide carrying platinum thereon, a cerium-containing oxide carrying palladium thereon, and an alkali metal compound and/or an alkaline earth metal compound, and a method for the production of the catalyst.

16 Claims, No Drawings

METHOD OF THE PURIFICATION OF THE EXHAUST GAS FROM A LEAN-BURN ENGINE USING A CATALYST

BACKGROUND OF THE INVENTION

1. Field of the Invention

This invention relates to a catalyst for purifying the exhaust gas from a lean-burn gasoline engine utilized as a drive engine mainly for an automobile and a method for the production thereof.

2. Description of the Related Art

In recent years, the feasibility of the introduction of a lean-burn gasoline engine to the drive engine of an automobile has been under study for the purpose of saving the fuel cost. In this case, the gasoline engine during the constant rate operation assumes a state of introducing air in an excess amount relative to the fuel to save the fuel cost. The conventional gasoline engine is operated at an air-fuel ratio (gravimetric ratio of fuel and air: hereinafter referred to as "A/F") falling in the neighborhood of 14.6. This ratio is called the theoretical air-fuel ratio. Since the oxygen and the flammable compound in the fuel gas are stoichiometrically on the relation of equivalency, the unburned gas and oxygen do not remain in the exhaust gas when the combustion is perfect.

Various catalysts for purifying engine exhaust gases have been studied heretofore. Among such catalysts, the so-called three way catalyst that features simultaneous removal of hydrocarbons, carbon monoxide, and nitrogen oxides in the neighborhood of the theoretical air-fuel ratio has not been given any due consideration concerning the ability to purify the nitrogen oxides in an excessively oxidizing atmosphere. The lean-burn gasoline engine that is fated to be enveloped with an oxygen-excess atmosphere during the constant rate travel purifies the nitrogen oxides only with difficulty.

The diesel engine and the boiler among the internal combustion engines generally adopt the method of using a reducing agent such as ammonia, hydrogen, or carbon monoxide in the removal of nitrogen oxides. This method, however, has the problem of necessitating a special device for the recovery and disposal of the unaltered reducing agent.

Recently, with a view to removing such nitrogen oxides, a method that resorts to a $NO_x$ decomposition catalyst formed of a copper ion-containing crystalline aluminosilicate has been proposed (JP-A-60-125,250 and U.S. Pat. No. 4,297,328). It is simply demonstrated to be capable of decomposing nitrogen monoxide (NO) into nitrogen ($N_2$) and oxygen ($O_2$). It encounters difficulty in removing nitrogen oxides effectively under the actual exhaust gas conditions.

JP-A-63-100,919 offers a statement that the treatment of the exhaust gas with a copper-containing catalyst under an oxidizing atmosphere in the presence of a hydrocarbon preferentially promotes the reaction of $NO_x$ with the hydrocarbon and induces efficient removal of $NO_x$. It is said that the hydrocarbon to be used in this method may be the hydrocarbon contained in the exhaust gas or the hydrocarbon optionally added from the external source. As a concrete mode of embodying this treatment, there is disclosed the method which comprises first bringing the exhaust gas into contact with the copper-containing catalyst thereby depriving it of $NO_x$ and then forwarding the remainder of the exhaust gas into contact with an oxidizing catalyst thereby depriving it of hydrocarbon, carbon monoxide etc. This method, however, requires a high temperature for effecting the removal of nitrogen oxides and produces insufficiently effect at a low temperature.

Further, since the catalyst mentioned above exhibits only poor resistance to heat and, on exposure to a high-temperature exhaust gas, suffers a decline in the ability thereof to decompose $NO_x$, a method which comprises disposing the catalysts parallely and, when the exhaust gas reaches an elevated temperature, by-passing the exhaust gas toward the side of the oxidizing catalyst or the three way catalyst has been disclosed as a preventive measure (JP-A-01-171,625).

International Publication WO 94/25143 has disclosed a method for depriving an exhaust gas of nitrogen oxides by using a catalyst comprising a noble metal such as platinum, palladium, or rhodium, a catalytically active component formed of a compound of an alkali metal such as lithium, or sodium, or an alkaline earth metal such as calcium, and a refractory inorganic oxide and intermittently introducing a reducing substance thereto. This method, as disclosed, has only the catalytically active component uniformly mixed with the refractory inorganic oxide instead of locally distributed thereon.

JP-A-08-117,600 has disclosed an exhaust gas purifying catalyst which comprises an alumina carrier, a noble metal deposited carrier in which a catalytic noble metal is deposited on ceria, and a $NO_x$ absorber formed of an alkali metal, an alkaline earth metal, and a rare earth element and which has the noble metal deposited carrier and the $NO_x$ absorber uniformly dispersed in the alumina carrier. This catalyst has the noble metal wholly deposited on the ceria.

Though various catalysts have been proposed, a nitrogen oxide decomposing catalyst that efficiently decomposes and removes $NO_x$ from the exhaust gas of a lean-burn engine and moreover excels in high temperature resistance has not been developed to date.

SUMMARY OF THE INVENTION

An object of this invention is to provide a nitrogen oxide purifying catalyst effecting efficient removal of $NO_x$ and having excellent high temperature resistance and resistance to poisoning, and a method for the production thereof.

The present inventors have pursued a diligent study with a view to fulfilling the object mentioned above and, as a result, have discovered a catalyst for purifying the exhaust gas from a lean-burn engine.

The object of this invention is therefore achieved by a catalyst for purifying the exhaust gas from a lean-burn engine which comprises i) a refractory inorganic oxide carrying platinum thereon, ii) a cerium-containing oxide carrying palladium thereon, and iii) an alkali metal compound and/or an alkaline earth metal compound.

The object of this invention is achieved by a method for the production of a catalyst for purifying the exhaust gas from a lean-burn engine, characterized by pulverizing and mixing a refractory inorganic oxide carrying platinum partly or wholly thereon, a cerium-containing oxide carrying palladium partly or wholly therein, and an alkali metal compound and/or an alkaline earth metal compound and either forming the resultant mixture in a three-dimensional structure or coating a refractory three-dimensional structure with the resultant mixture.

The object of this invention is further achieved by a method for the production of a catalyst for purifying the exhaust gas from a lean-burn engine, characterized by pulverizing and mixing a refractory inorganic oxide carrying platinum partly or wholly thereof with a cerium-containing oxide carrying palladium partly or wholly thereon, either forming the resultant mixture in a three-dimensional structure or coating a refractory three-dimensional structure with the resultant mixture, and thereafter depositing thereon the salt of an alkali metal compound and/or an alkaline earth metal compound, The above and other objects, features, and advantages of the present invention will become clear from the following description of the preferred embodiments.

DESCRIPTION OF THE PREFERRED EMBODIMENTS

In the purification of the exhaust gas from a lean-burn engine, the catalyst of this invention is capable of oxidize HC (hydrocarbon), CO, NO and $N_2O$ and at the same time adsorbs $NO_2$ under an oxidizing condition, reduces or decomposes the adsorbed $NO_2$ with the HC in the exhaust gas as a reducing agent under a reducing condition and, at the same time, oxidizes CO by utilizing the adsorbed oxygen, and consequently accomplishes the purification of the exhaust gas. Here, for the purpose of saving the fuel cost, the engine is generally operated under an oxidizing condition introducing air in an excess amount relative to the fuel, and a short-time reducing atmosphere is repeated to reduce the amount of $NO_x$. For example, the reducing condition is preferred to last for an approximate period of 2–5 seconds based on 60 seconds of the oxidizing state.

The exhaust gas from a lean-burn engine is preferred to be an exhaust gas at the air/fuel (A/F) ratio of not less than 15 in the operation of the engine at least during the low speed travel, more preferably an exhaust gas in which the fuel combustion is repeatedly varied between the neighborhood of stoichiometry and the status of lean.

i) The refractory inorganic oxide to be used for carrying platinum partly or wholly thereon may be any of the refractory inorganic oxides which are generally adopted as the carrier for a catalyst with the exception of cerium oxide. As concrete examples of such refractory inorganic oxides, there may be cited, for example, $\alpha$-alumina, $\gamma$, $\delta$, $\eta$, and $\theta$ active alumina, titania, or zirconia; silicon oxide, and complex oxides thereof such as, alumina-titania, alumina-zirconia, titania-zirconia etc. The oxides and complex oxides of aluminum, zirconium, titanium, and silicon, mixtures thereof, are preferably used and active alumina is used especially. When platinum is carried partly on the refractory inorganic oxide, the weight of the refractory inorganic oxide not containing platinum may be up to 20% by weight based on the weight of the refractory inorganic oxide containing platinum Platinum does not need to be particularly discriminated so long as it manifests a catalytic activity. As concrete examples of such platinum, metallic platinum, platinum oxide, and platinum black may be cited.

The refractory inorganic oxide may have a BET surface area generally in the range of 5–500 $m^2/g$, preferably in the range of 50–200 $m^2/g$.

While platinum generally is required to be uniformly carried partly or wholly on the refractory inorganic oxide, it is preferred to be uniformly carried wholly thereon from the viewpoint of dispersibility.

The amount of platinum to be used may be generally in the range of 0.1–20 g, preferably in the range of 0.5–10 g, and most preferably in the range of 1–5 g, per liter of the final catalyst. If the amount is less than 0.1 g, the catalyst will produce a fully satisfactory oxidizing activity in the initial stage or after the protracted service. Conversely, if this amount exceeds 20 g, the excess will bring the disadvantage that no proportionate addition is made to the oxidizing activity. The amount of the refractory inorganic oxide to be used may be generally in the range of 10–500 g, preferably in the range of 50–400 g, and most preferably in the range of 100–300 g, per liter of the final catalyst. If the amount is less than 10 g, the shortage will being the disadvantage that platinum is not fully satisfactorily dispersed and is possibly suffered to aggregate. Conversely, if this amount exceeds 500 g, the excess will bring the disadvantage that the platinum has an unduly low density and fails to produce a fully satisfactory oxidizing activity and the exhaust gas suffers from unduly high pressure loss. Here, the amount of a given component of the composition per liter of the final catalyst is expressed based on the volume of the molded catalyst when this catalytic component is molded or on the volume of the three-dimensional structure when the catalytic component is deposited on the refractory three-dimensional structure. The amount of the catalyst component to be used is based on the final catalyst (volume) in practically the same sense that this amount is based on the carrier (volume) to be used when the catalyst component is elected to coat the refractory three-dimensional structure. This relation similarly applies herein below.

The component having an oxidizing activity and used in this invention mainly fulfills, on contacting the exhaust gas containing $NO_x$ under an oxidizing atmosphere, the role of oxidizing NO, $N_2O$, etc. existing at high ratios as the $NO_x$ component in the exhaust gas to $NO_2$ or of activating them.

ii) As concrete examples of the cerium-containing oxide to be used for carrying palladium partly or wholly thereon, simple cerium compounds, oxides formed of cerium and at least one element selected from the group consisting of zirconium, yttrium, and rare earth elements (excluding cerium), mixtures thereof, complex oxides such as alumina-titania, alumina-zirconia, titania-zirconia and cerium-zirconium, and mixtures of oxides with complex oxides may be cited. Among other cerium-containing oxides mentioned above, cerium-zirconium complex oxides prove particularly preferable from the viewpoint of heat resistance. When palladium is to be carried partly on the cerium-containing oxide, the cerium-containing oxide not containing palladium is allowed to contain in an amount of up to 50% by weight based on the weight of the cerium-containing oxide containing palladium. When cerium and other material are combined, the oxide is preferred to be in the range of 20–400 g per 100 g of cerium. This range is important because the cerium oxide can no longer manifest the ability thereof to adsorb and release oxygen fully satisfactorily when the amount deviates this range. As rare earth elements mentioned above, scandium, lanthanum, praseodymium, and neodymium may be cited.

Palladium compounds do not need to be particularly restricted so long as they manifest a catalytic activity. As concrete examples thereof, metallic palladium, palladium oxides, and palladium black may be cited.

The oxides of zirconium, yttrium, and rare earth elements (excluding cerium) are preferred to have a BET surface area generally in the range of 1–300 $m^2/g$, preferably in the range of 10–150 $m^2/g$.

Though palladium generally is required to be carried uniformly on part or the whole of the cerium-containing oxide, the uniform carriage proves preferable from the viewpoint of dispersibility.

The amount of palladium to be used may be generally in the range of 0.1–50 g, preferably in the range of 0.5–30 g, and most preferably in the range of 1–20 g, based on 1 liter of the final catalyst. If the amount is less than 0.1 g, no fully satisfactory oxidation-reduction activity will be obtained during the initial stage and after the protracted service. In contrast, if this amount exceeds 50 g, the excess will bring no proportionate addition to the oxidation-reduction activity. The amount of the cerium-containing oxide to be used may be generally in the range of 0.5–500 g, preferably in the range of 1–200 g, and most preferably in the range of 5–100 g, per 1 liter of the final catalyst. If the amount is less than 0.5 g, the shortage will bring the disadvantage that palladium is not dispersed fully satisfactorily and oxygen is not adsorbed fully satisfactorily. Conversely, if this amount exceeds 500 g, the excess will bring the disadvantage that the density of palladium therein is lowered, no fully satisfactory reducing activity is obtained, and the pressure loss of the exhaust gas is heightened.

The reducing component to be used in this invention mainly fulfills the role of reducing or decomposing the adsorbed $NO_2$ with the HC contained in the exhaust gas as a reducing agent and, at the same time, oxidizing the CO contained in the exhaust gas by utilizing the oxygen adsorbed on ceria. Noble metals such as rhodium have the possibility of being readily oxidized into oxides in an oxygen atmosphere with a possible easy loss of their catalytic activity and exhibit this trend strongly particularly when they are used in conjunction with ceria which has the function of adsorbing and releasing oxygen because of an increase in the probability of contacting oxygen. The catalyst of this invention, however, has no possibility of losing any catalytic activity because it uses as a noble metal only palladium which has a high-temperature resistance to oxygen.

iii) The alkali metal compound and/or the alkaline earth metal compound does not need to be particularly restricted so long as it has an ability to adsorb the oxidized and activated $NO_x$, particularly $NO_2$. The oxide of at least one element selected from the group consisting of sodium, potassium, rubidium, cesium, beryllium, magnesium, strontium, and barium of the mixture of such oxides proves particularly preferable.

The amount of the alkali metal compound and/or the alkaline earth metal compound to be used may be generally in the range of 0.1–200 g, preferably in the range of 0.5–150 g, and most preferably in the range of 1–100 g, per liter of the final catalyst. If the amount is less than 0.1 g, no fully satisfactory adsorption of $NO_2$ will be effected under an oxidizing condition and the oxidizing activity of palladium will not be repressed fully satisfactorily under a reducing condition and preferential oxidation of CO and HC will proceed. In contrast, if this amount exceeds 200 g, the excess will bring the disadvantage that the repress of the oxidizing activity by palladium increases, the oxidizing activity of CO and HC is lowered, the purifying activity of $NO_x$ is also lowered, and the pressure loss of the exhaust gas is heightened.

The component to be used for adsorbing $NO_2$ in this invention mainly fulfills the role of adsorbing the oxidized or activated $NO_2$ under an oxidizing atmosphere.

The amount of the $NO_2$ adsorbed by the component can be determined by such a preliminary test as described below. The amount of adsorption can be measured under the conditions for performing a treatment using the catalyst of this invention directly in an internal combustion engine or in a desk-top device imitating the temperature, composition, flow volume etc. of the exhaust gas from an actual internal combustion engine (the method described in International Publication WO 94-15,143, for example).

First, a catalyst column provided in the front side and the rear side thereof each with an analyzer for nitrogen oxides is packed with a prescribed amount of a catalyst according to this invention. Then, a mixed gas of oxygen and nitrogen fixed at a temperature and a flow volume of the prevalent exhaust gas under the working condition of the catalyst is set flowing until it is thoroughly stabilized, subsequently the mixed gas is switched to a gas containing nitrogen oxides at a prevalent concentration under the working conditions of the catalyst, and this gas is introduced into the catalyst bed. The effluent from the catalyst bed is continuously measured for the concentration of nitrogen oxides with the analyzer for nitrogen oxides disposed behind the catalyst bed until the measured concentration ceases to show a change. The difference of the concentration of nitrogen oxides before and after the catalyst bed is integrated and the quantity consequently found may be reported as the amount of nitrogen oxides adsorbed on the catalyst.

The catalyst happens to have an ability to decompose nitrogen oxides during the measurement of the amount of nitrogen oxides to be adsorbed. The measurement of the amount of adsorption with respect to such a catalyst cannot rely on the concentration of nitrogen oxides before the catalyst bed as the standard. In place of this concentration, therefore, the numerical value which the nitrogen oxides after the catalyst bed constantly show during the measurement of the amount of adsorption mentioned above is used for computing the amount of adsorption in the same manner as described above.

As respects the relation of the components i), ii), and iii) of the catalyst mentioned above, i) the refractory inorganic oxide partly or wholly carrying platinum thereon and ii) the cerium-containing oxide partly or wholly carrying palladium thereon are uniformly dispersed and mixed and further iii) the alkali metal compound and/or the alkaline earth metal compound is preferred to be carried on part or the whole of i) and ii), particularly preferably on the whole of them from the viewpoint of the adsorption ratio of $NO_2$.

The total amount of the catalyst components i), ii), and iii) to be used may be generally in the range of 50–500 g, preferably in the range of 100–300 g, and most preferably in the range of 150–250 g per 1 liter of the resultant catalyst. If this amount is less than 50 g, no fully satisfactory catalytic property will be obtained during the initial stage and after the protracted service. Conversely, if the amount exceeds 500 g, the excess will give no proportionate addition to the catalytic activity and will induce such inconveniences as pressure loss of the exhaust gas.

Substantial noble metals without platinum and palladium have not been contained in the present catalyst. The means of "substantial" is that the noble metals other than Pt and Pd are positively not added in the catalyst as the catalyst component.

As concrete examples of the embodiment of the use of the catalyst of this invention, it may be cited (1) a method of forming the catalyst itself in a prescribed shape such as spheres or cylinders and putting such spheres or cylinders to use and (2) a method of coating with catalyst components a refractory three-dimensionally constructed carrier such as a honeycomb monolithic substrate, a formed substrate, or a corrugated substrate preferably made of a ceramic substance or a metallic substance, and putting the resultant coated substrate to use.

Now, the methods for preparing the catalyst will be described below.

(1) In the case of using a catalyst composition itself as the catalyst, it may be cited (A) a method which comprises thoroughly mixing a catalytic composition, then forming the resultant mixture in the shape of cylinders or spheres, and using such cylinders or spheres as the catalyst and (B) a method which comprises preparatorily forming a refractory inorganic substance in a prescribed shape (such as, spheres or cylinders), and then coating such spheres or cylinders with a catalytic substance.

(2) In the case of using a one-piece structure or an inert inorganic substrate (referred to as "integral structure" hereinafter), (A) a method which comprises placing in a ball mill a catalytic composition in a lump, wet pulverizing the composition into an aqueous slurry, immersing an integral structure in the aqueous slurry, drying the wet integral structure, and calcining the dried body and (B) a method which comprises wet pulverizing a refractory inorganic oxide with a ball mill thereby converting the oxide into an aqueous slurry, immersing an integral structure in the slurry, drying the wet structure, calcining the dried structure, then immersing the structure coated with the refractory inorganic oxide in the aqueous solution of an alkali metal and/or an alkaline earth metal, drying the wet structure, and calcining the dried structure may be available. The method that resorts to coating the integral structure is preferred over the other method.

The integral structure, may be shaped like a pellet or a honeycomb. The one-piece molded honeycomb structure proves particularly preferable among other one-piece structures. As concrete examples of the one-piece molded honeycomb substrate, a monolithic honeycomb substrate, a metal honeycomb substrate, and a plug honeycomb carrier may be cited.

The monolithic substrate has only to be what is popularly called a ceramic honeycomb substrate. Particularly, the honeycomb substrates that use cordierite, mullite, α-alumina, zirconia, titania, titanium phosphate, aluminum titanate, petalite, spodumene, aluminosilicate, magnesium silicate etc. as materials are preferable. Among other honeycomb substrates mentioned above, the honeycomb substrate made of cordierite proves particularly preferable. Integral structures that are obtained by using such heat-resistant metals resistant to oxidation such as stainless steel and Fe—Cr—Al alloy are also used.

These monolithic substrates are manufactured by an extrusion molding method or a method which comprises winding tightly a sheet element. The shape of the gas passing hole (cell) may be a hexagon, a tetragon, a triangle, or corrugation, whichever fits the occasion most. A cell density (number of cells/unit cross sectional area) in the range of 100–600 cells/square inch, preferably in the range of 200–500 cells/square inch, may be fully satisfactory for the purpose of use.

The method for coating the substrate with the components of the catalyst composition in this invention does not need to be particularly restricted but may be properly selected from the popular methods which are available for impregnation.

First, the powder of a refractory inorganic oxide such as alumina is placed in a prescribed amount in the aqueous solution containing a salt such as nitrate of platinum in a prescribed amount thereby impregnating the powder with the aqueous solution. Then, the impregnated powder is dried generally at a temperature in the range of 80–250° C. and calcined generally at a temperature in the range of 300–850° C. for a period in the range of 0.5–5 hours to obtain a refractory inorganic oxide carrying platinum thereon.

Separately, the powder of a cerium-containing oxide such as a complex oxide of cerium and zirconium is placed in a prescribed amount in the aqueous solution containing a salt such as nitrate of palladium in a prescribed amount thereby impregnating the powder with the aqueous solution. The impregnated powder is dried generally at a temperature in the range of 80–250° C. and then calcined generally at a temperature in the range of 300–850° C. for a period in the range of 0.5–5 hours to obtain a cerium-containing oxide carrying palladium thereon.

Also, the above treatment of the cerium-containing oxide may be firstly carried out prior to the treatment of the refractory inorganic oxide.

Further, as the alkali metal compound and/or the alkaline earth metal compound, the oxide, hydroxide, nitrate, nitrite, or acetate may be used.

The refractory inorganic oxide carrying platinum thereon, the cerium-containing oxide carrying palladium partly or wholly therein, and the powder of alkali metal compound and/or alkaline earth metal compound obtained as described above and water added thereto at a prescribed ratio are wet pulverized to form a slurry. The refractory three-dimensional structure such as a honeycomb substrate is immersed in the slurry. The wet honeycomb substrate is drained of excess slurry, then dried generally at a temperature in the range of 80–250° C., and optionally calcined generally at a temperature in the range of 300–800° C. for a period in the range of 0.5–3 hours to obtain a final catalyst.

The slurry prepared of the refractory inorganic oxide carrying platinum thereon and the cerium-containing oxide carrying palladium thereon is coated to the honeycomb structure and then the coated layer of the slurry is dried and optionally calcined. Thereafter, the structure coated with the refractory inorganic oxide carrying platinum thereon and the cerium-containing oxide carrying palladium thereon is immersed in the aqueous solution of an alkali metal compound and/or an alkaline earth metal compound until the aqueous solution is deposited in a prescribed amount on the structure and the deposited layer of the aqueous solution is dried and optionally calcined.

EXAMPLES

Now, this invention will be described more specifically below with reference to examples. It should be noted, however, that this invention is not limited to these examples.

Example 1

A raw material powder (a) was obtained by adding an aqueous dinitrodiamino platinum nitrate solution containing 1 g of platinum to 100 g of active alumina having a BET surface area of 100 m$^2$/g, mixing them, then drying the resultant mixture at 120° C. for two hours, pulverizing the dried mixture, and calcining the pulverized mixture at 500° C. for two hours. Meanwhile, a raw material powder (b') was obtained by adding an aqueous cerium nitrate solution containing 10 g of cerium as reduced to cerium oxide to 40 g of zirconium oxide having a BET surface area of 80 m$^2$/g, mixing them, then drying the resultant mixture at 120° C. for two hours, pulverizing the dried mixture, and calcining the pulverized mixture at 500° C. for two hours. A raw material powder (b) was obtained by adding an aqueous palladium nitrate solution containing 2 g of palladium to the raw material powder (b') mixing them, then drying the resultant mixture at 120° C. for two hours, pulverizing the dried mixture, and calcining the pulverized mixture at 500° C. for two hours. The resultant powders (a) and (b) were wet pulverized to give rise to an aqueous slurry. In the aqueous slurry, was immersed a commercially available cordierite honeycomb substrate (containing an average of 400 gas passing cells per square inch of cross section and measuring 33 mm in diameter, 76 mm in length, and 65 mL in volume; available from NGK in Japan.) and then the wet substrate was blown with compressed air to expel excess slurry. The substrate was then dried at 120° C. for two hours and then calcined at 500° C. for two hours to obtain an intermediate catalyst (A'). This intermediate catalyst (A') was immersed in an aqueous potassium acetate solution containing 10 g of potassium as potassium oxide. The wet intermediate catalyst (A') was blown with compressed air to expel excess solution. It was then dried at 120° C. for two hours and subsequently calcined at 500° C. for two hours to obtain a final catalyst (A). This catalyst (A) was found to carry thereon 1 g of platinum, 2 g of palladium, 100 g of active alumina, 40 g of zirconium oxide, 10 g of cerium oxide, and 10 g of potassium oxide per liter of the volume of the honeycomb catalyst.

Example 2

The procedure of Example 1 was repeated except that in the preparation of the powder (a), 100 g of active alumina having a BET surface area of 150 $m^2/g$ and containing zirconium oxide at a ratio of 5% were used instead of 100 g of the active alumina having a BET surface area of 100 $m^2/g$, to give rise to a final catalyst (B). This catalyst (B) was found to carry thereon 1 g of platinum, 2 g of palladium, 95 g of active alumina, 45 g of zirconium oxide, 10 g of cerium oxide, and 10 g of potassium oxide per 1 liter of the honeycomb catalyst.

Example 3

The procedure of Example 1 was repeated except that in the preparation of the powder (a), 100 g of active alumina having a BET surface area of 150 $m^2/g$ and containing titanium oxide at a ratio of 5% were used instead of 100 g of the active alumina having a BET surface area of 100 $m^2/g$, to give rise to a final catalyst (C). This catalyst (C) was found to carry thereon 1 g of platinum, 2 g of palladium, 95 g of active alumina, 5 g of titanium oxide, 40 g of zirconium oxide, 10 g of cerium oxide, and 10 g of potassium oxide per 1 liter of the honeycomb catalyst.

Example 4

The procedure of Example 1 was repeated except that in the preparation of the powder (a), 100 g of active alumina having a BET surface area of 150 $m^2/g$ and containing silicon oxide at a ratio of 5% were used instead of 100 g of the active alumina having a BET surface area of 100 $m^2/g$, to give rise to a final catalyst (D). This catalyst (D) was found to carry thereon 1 g of platinum, 2 g of palladium, 95 g of active alumina, 5 g of silicon oxide, 40 g of zirconium oxide, 10 g of cerium oxide, and 10 g of potassium oxide per 1 liter of the honeycomb catalyst.

Example 5

The procedure of Example 1 was repeated except that in the preparation of the powder (a), 100 g of zirconium oxide having a BET surface area of 100 $m^2/g$ were used instead of 100 g of the active alumina having a BET surface area of 100 $m^2/g$, to give rise to a final catalyst (E). This catalyst (E) was found to carry thereon 1 g of platinum, 2 g of palladium, 140 g of zirconium oxide, 10 g of cerium oxide, and 10 g of potassium oxide per 1 liter of the honeycomb catalyst.

Example 6

The procedure of Example 1 was repeated except that in the preparation of the powder (a), 100 g of titanium oxide having a BET surface area of 100 $m^2/g$ and an anatase type crystalline structure were used instead of 100 g of the active alumina having a BET surface area of 100 $m^2/g$, to give rise to a final catalyst (F). This catalyst (F) was found to carry thereon 1 g of platinum, 2 g of palladium, 100 g of titanium oxide, 40 g of zirconium oxide, 10 g of cerium oxide, and 10 g of potassium oxide per 1 liter of the honeycomb catalyst.

Example 7

The procedure of Example 1 was repeated except that in the preparation of the powder (a), 100 g of silicon oxide having a BET surface area of 100 $m^2/g$ were used instead of 100 g of the active alumina having a BET surface area of 100 $m^2/g$, to give rise to a final catalyst (G). This catalyst (G) was found to carry thereon 1 g of platinum, 2 g of palladium, 100 g of silicon oxide, 40 g of zirconium oxide, 10 g of cerium oxide, and 10 g of potassium oxide per 1 liter of the honeycomb catalyst.

Example 8

The procedure of Example 1 was repeated except that in the preparation of the powder (b), an aqueous lanthanum nitrate solution containing 5 g of lanthanum as lanthanum oxide was added simultaneously with the aqueous cerium nitrate solution, to give rise to a final catalyst (H). This catalyst (H) was found to carry thereon 1 g of platinum, 2 g of palladium, 100 g of active alumina, 40 g of zirconium oxide, 10 g of cerium oxide, 5 g of lanthanum oxide, and 10 g of potassium oxide per 1 liter of the honeycomb catalyst.

Example 9

The procedure of Example 1 was repeated except that an aqueous potassium acetate solution containing 20 g of potassium as potassium oxide was used instead of the aqueous potassium acetate solution containing 10 g of potassium as potassium oxide, to give rise to a final catalyst (I). This catalyst (I) was found to carry thereon 1 g of platinum, 2 g of palladium, 100 g of active alumina, 40 g of zirconium oxide, 10 g of cerium oxide, and 20 g of potassium oxide per 1 liter of the honeycomb catalyst.

Example 10

The procedure of Example 1 was repeated except that an aqueous barium acetate solution containing 10 g of barium as barium oxide was used instead of the aqueous potassium acetate solution containing 10 g of potassium as potassium oxide, to give rise to a final catalyst (J). This catalyst (J) was found to carry thereon 1 g of platinum, 2 g of palladium, 100 g of active alumina, 40 g of zirconium oxide, 10 g of cerium oxide, and 10 g of barium oxide per 1 liter of the honeycomb catalyst.

Example 11

The procedure of Example 1 was repeated except that a mixed aqueous solution of potassium acetate containing 10 g of potassium as potassium oxide and barium acetate containing 10 g of barium as barium oxide was used instead of the aqueous potassium acetate solution containing 10 g of potassium as potassium oxide, to give rise to a final catalyst (K). This catalyst (K) was found to carry thereon 1 g of platinum, 2 g of palladium, 100 g of active alumina, 40 g of zirconium oxide, 10 g of cerium oxide, 10 g of potassium oxide, and 10 g of barium oxide per 1 liter of the honeycomb catalyst.

Comparative Example 1

An aqueous platinum nitrate solution containing 1 g of platinum and an aqueous rhodium nitrate solution containing 0.2 g of rhodium were added to 100 g of the same active alumina as used in Example 1 and they were mixed. The resultant mixture was dried at 120° C. for two hours and calcined at 500° C. for two hours to obtain a powder (s). This powder (s) was wet pulverized in a ball mill to obtain an aqueous slurry. The same cordierite honeycomb carrier as used in Example 1 was immersed in the aqueous slurry and the wet carrier was blown with compressed air to expel excess slurry. The carrier was then dried at 120° C. for two hours and then calcined at 500° C. for two hours to obtain a final catalyst (S). This catalyst (S) was found to contain 1 g of platinum, 0.2 g of rhodium, and 100 g of active alumina per 1 liter of the volume of the honeycomb catalyst.

Comparative Example 2

The procedure of Comparative Example 1 was repeated except that in the preparation of the slurry, the powder (b') prepared in Example 1 was added. This catalyst (T) was found to contain 1 g of platinum, 0.2 g of rhodium, 100 g of active alumina, 40 g of zirconium oxide, and 10 g of cerium oxide per 1 liter of the honeycomb catalyst.

Comparative Example 3

A final catalyst (U) was obtained by immersing the catalyst (T) of Comparative Example 2 in an aqueous potassium acetate solution containing 10 g of potassium as potassium oxide, blowing the wet catalyst with compressed air to expel excess solution, then drying the wet catalyst at 120° C. for two hours, subsequently calcining the dried catalyst at 500° C. for two hours. This catalyst (U) was found to contain 1 g of platinum, 0.2 g of rhodium, 100 g of active alumina, 40 g of zirconium oxide, 10 g of cerium oxide, and 10 g of potassium oxide per 1 liter of the honeycomb catalyst.

Comparative Example 4

The procedure of Example 1 was repeated except that during the preparation of the aqueous slurry, the powder (b') was used instead of the powder (b), to give rise to a final catalyst (V). This catalyst (V) was found to contain 1 g of platinum, 100 g of active alumina, 40 g of zirconium oxide, 10 g of cerium oxide, and 10 g of potassium oxide per 1 liter of the honeycomb catalyst.

Comparative Example 5

The procedure of Example 1 was repeated except that during the preparation of the aqueous slurry, 100 g of active alumina were used instead of the powder (a), to give rise to a final catalyst (W). This catalyst (W) was found to contain 2 g of palladium, 100 g of active alumina, 40 g of zirconium oxide, 10 g of cerium oxide, and 10 g of potassium oxide per 1 liter of the honeycomb catalyst.

Comparative Example 6

A raw material powder (w) was obtained by adding an aqueous dinitrodiamino platinum nitrate solution containing 1 g of platinum and an aqueous palladium nitrate solution containing 2 g of palladium to 100 g of active alumina having a BET surface area of 100 m²/g, mixing them, drying the resultant wet mixture at 120° C. for two hours, pulverizing the dried mixture, and calcining the pulverized mixture at 500° C. for two hours. An aqueous slurry was obtained by wet pulverizing this powder (w) and the powder (b') prepared in Example 1 in a ball mill. The same cordierite honeycomb substrate as used in Example 1 was immersed in the aqueous slurry and then the wet substrate was blown with compressed air to expel excess slurry. Then, the wet substrate was dried at 120° C. for two hours and then calcined at 500° C. for two hours to obtain an intermediate catalyst (X'). This intermediate catalyst (X') was immersed in an aqueous potassium acetate solution containing 10 g of potassium as potassium oxide and then the wet catalyst was blown with compressed air to expel excess solution. Then, the wet catalyst was dried at 120° C. for two hours and calcined at 500° C. for two hours to obtain a final catalyst (X). This catalyst (X) was found to carry therein 1 g of platinum, 2 g of palladium, 100 g of active alumina, 40 g of zirconium oxide, 10 g of cerium oxide, and 10 g of potassium oxide per 1 liter of the honeycomb catalyst.

Comparative Example 7

A raw material powder (Y) was obtained by adding an aqueous dinitrodiamino platinum nitrate solution containing 1 g of platinum and an aqueous palladium nitrate solution containing 2 g of palladium to the raw material powder (b') obtained in Example 1, mixing them, drying the resultant mixture at 120° C. for two hours, pulverizing the dried mixture, and calcining the dried mixture at 500° C. for two hours. An aqueous slurry was obtained by wet pulverizing the powder (y) and 100 g of active alumina having a BET surface area of 100 m²/g in a ball mill. The same cordierite honeycomb substrate as used in Example 1 was immersed in the aqueous slurry and the wet substrate was then blown with compressed air to expel excess slurry. Then, the wet substrate was dried at 120° C. for two hours and calcined at 500° C. for two hours to obtain an intermediate catalyst (Y'). This intermediate catalyst (Y') was immersed in an aqueous potassium acetate solution containing 10 g of potassium as potassium oxide and the wet catalyst was then blown with compressed air to expel excess solution. Then, the wet catalyst was dried at 120° C. for two hours and calcined at 500° C. for two hours to obtain a final catalyst (Y). This catalyst (Y) was found to carry therein 1 g of platinum, 2 g of palladium, 100 g of active alumina, 40 g of zirconium oxide, 10 g of cerium oxide, and 10 g of potassium oxide per 1 liter of the honeycomb catalyst.

Comparative Example 8

One hundred (100) g of a commercially available ZSM-5 type zeolite ($SiO_2/Al_2O_3$ ratio=80) and 400 g of purified water added thereto were stirred at 98° C. for two hours. Then, an aqueous 0.2 mol/liter ammine copper complex solution was slowly added dropwise to the resultant mixture. The produced mixture was filtered to separate the zeolite and the residue was thoroughly washed and dried at 120° C. for 24 hours. The resultant powder was wet pulverized in a ball mill to obtain an aqueous slurry. The same cordierite honeycomb substrate as used in Example 1 was immersed in this aqueous slurry and the wet substrate was blown with compressed air to expel excess slurry. Then, the wet substrate was dried at 120° C. for two hours and calcined at 500° C. for two hours to obtain a final catalyst (Z). This catalyst carried therein 5.6 wt. % of copper based on the amount of the ZSM-5 type zeolite.

The catalysts (A)–(K) and (S)–(Z) obtained respectively in Examples 1–11 and Comparative Examples 1–8 were tested for initial property and for property affected by aging.

TABLE 1

| | Reaction gas composition | |
|---|---|---|
| Gas composition | 1 (Lean) | 2 (Rich) |
| Propylene | 5000 ppm $C_1$ | 5000 ppm $C_1$ |
| CO | 0.3% | 3% |
| NO | 600 ppm | 600 ppm |
| $O_2$ | 15% | 0.5% |
| $CO_2$ | 6% | 13% |
| $H_2O$ | 10% | 10% |
| $N_2$ | Balance | Balance |
| $SO_2$ | 10 ppm | 10 ppm |

Initial Property

A given catalyst was tested by the following methods 1, 2 for evaluating property. The results are shown in Tables 2 and 3.

Method 1 for Evaluating Property

Into a stainless steel reaction tube, 34.5 mm in diameter and 300 mm in length, which was packed with a given catalyst, the reaction gases of the compositions shown above were introduced at a space velocity of 40000 $Hr^{-1}$ in such a manner as to repeat a cycle consisting of 60 seconds of the gas composition 1 and 10 seconds of the gas composition 2. The gases for three cycles were tested for average ratios of purification of HC, CO, $NO_x$ at a catalyst bed inlet temperature of 350° C. The results of the initial property are shown in Table 2.

TABLE 2

| | Initial property (ratio of purification: %) | | |
|---|---|---|---|
| Catalyst | HC | CO | NOx |
| A | 94 | 97 | 92 |
| B | 92 | 96 | 95 |
| C | 91 | 93 | 94 |
| D | 95 | 98 | 93 |
| E | 91 | 92 | 96 |
| F | 90 | 93 | 93 |
| G | 88 | 86 | 88 |
| H | 95 | 98 | 95 |
| I | 89 | 92 | 99 |
| J | 96 | 98 | 97 |
| K | 91 | 93 | 95 |
| S | 95 | 96 | 30 |
| T | 96 | 98 | 33 |
| U | 89 | 87 | 62 |
| V | 88 | 83 | 71 |
| W | 80 | 71 | 42 |
| X | 90 | 89 | 75 |
| Y | 78 | 73 | 55 |
| Z | 50 | 40 | 35 |

Test 2 for Evaluating Durable Property

The cruising phase exhaust gas (A/F=20) emanating from a commercially available lean-burn engine was passed through a multi-converter packed with a given catalyst under the conditions of 160000 $Hr^{-1}$ of space velocity (S.V.) and 700° C. of catalyst bed temperature. Thereafter, the exhaust gas was tested for the rate of purification of $NO_x$ in the same manner as in the test for initial property mentioned above to rate the catalyst for catalytic property. The results of the durable property are shown in Table 3.

TABLE 3

| | Durable property (ratio of purification: %) | | |
|---|---|---|---|
| Catalyst | HC | CO | NOx |
| A | 90 | 92 | 88 |
| B | 90 | 90 | 90 |
| C | 90 | 90 | 89 |
| D | 92 | 92 | 91 |
| E | 85 | 89 | 90 |
| F | 86 | 87 | 88 |
| G | 85 | 80 | 85 |
| H | 91 | 93 | 92 |
| I | 85 | 89 | 93 |
| J | 93 | 96 | 93 |
| K | 90 | 91 | 90 |
| S | 93 | 94 | 20 |
| T | 94 | 96 | 28 |
| U | 80 | 82 | 55 |
| V | 85 | 79 | 63 |
| W | 73 | 69 | 33 |
| X | 88 | 85 | 69 |
| Y | 72 | 68 | 43 |
| Z | 5 | 5 | 5 |

The catalyst according to this invention is capable of purifying nitrogen oxides, hydrocarbon, and carbon monoxide in the exhaust gas from a lean-burn engine either simultaneously or by the repetition of accumulation/decomposition.

The method of this invention for the production of a catalyst allows provision of a catalyst which fits very easy purification of the exhaust gas from a lean-burn engine.

While the embodiments or examples of the present invention, as herein disclosed, constitute a preferred form, it is to be understood that other form might be adopted.

The entire disclosure of Japanese Patent Application No. 10-293852 filed on Oct. 15, 1998 including specification, claims, drawing and summary are incorporated herein by reference in its entirety.

What is claimed is:

1. A method for the purification of the exhaust gas from a lean-burn engine run at an air/fuel ratio of not less than 15 using a catalyst, bringing the exhaust gas into contact with the catalyst comprising, as components,
   (i) a refractory inorganic oxide having platinum carried partly or wholly thereon,
   (ii) a cerium-containing oxide having palladium carried partly or wholly thereon, and
   (iii) at least one member selected from the group consisting of an alkali metal compound and an alkaline earth metal compound,
   wherein substantially no other noble metal is contained, except for platinum and palladium.

2. A method according to claim 1, wherein the refractory inorganic oxide is the oxide of at least one element selected from the group consisting of aluminum, zirconium, titanium, silicon and mixtures thereof.

3. A method according to claim 1, wherein the refractory inorganic oxide is the complex oxide of at least two elements selected from the group consisting of aluminum, zirconium, titanium, silicon mixtures thereof.

4. A method according to claim 1, wherein an amount of platinum is contained in the range of 0.1 to 20 g per 1 liter of the catalyst.

5. A method according to claim 1, wherein an amount of the refractory inorganic oxide is contained in the range of 10 to 50 g per 1 liter of the catalyst.

6. A method according to claim 1, wherein the cerium-containing oxide is a complex of cerium oxide and the oxide of at least one element selected from the group consisting of zirconium, yttrium, and rare earth elements (excluding cerium).

7. A method according to claim 6, wherein an amount of the cerium-containing oxide is contained in the range of 0.5 to 500 g per 1 liter of the catalyst.

8. A method according to claim 1, wherein the cerium-containing oxide is a mixture of cerium oxide and the oxide of at least one element selected from the group consisting of zirconium, yttrium, and rare earth elements (excluding cerium).

9. A method according to claim 8, wherein an amount of the cerium containing oxide is contained in the range of 0.5 to 500 g per 1 liter of the catalyst.

10. A method according to claim 1, wherein an amount of palladium is contained in the range of 0.1 to 50 g per 1 liter of the catalyst.

11. A method according to claim 1, wherein the member selected from the group consisting of an alkali metal compound and an alkaline earth metal compound is the oxide of at least one element selected from the group consisting of sodium, potassium, rubidium, cesium, beryllium, magnesium, strontium, barium and mixtures thereof.

12. A method according to claim 11, wherein an amount of the member is contained in the range of 0.1 to 200 g per 1 liter of the catalyst.

13. A method according to claim 1, wherein the item (iii) is carried on or mixed with part or whole of a mixture of the refractory inorganic oxide having platinum carried partly or wholly thereon and the cerium-containing oxide having palladium carried partly or wholly thereon.

14. A method according to claim 1, wherein the items (i), (ii), and (iii) are coated on a refractory three-dimensional structure.

15. A method according to claim 14, wherein the refractory three-dimensional structure is a honeycomb substrate.

16. A method according to claim 1 for the purification of the exhaust gas including reduction of nitrogen oxide content thereof, from a lean-burn engine run at an air/fuel ratio of not less than 15 using a catalyst, bringing the exhaust gas into contact with the catalyst comprising, as components, (i) a refractory inorganic oxide having platinum carried partly or wholly thereon, (ii) a cerium-containing oxide having palladium carried partly or wholly thereon, and (iii) at least one member selected from the group consisting of an alkali metal compound and an alkaline earth metal compound, wherein substantially no other noble metal is contained, except for platinum and palladium.

* * * * *